(12) United States Patent
Chern et al.

(10) Patent No.: US 9,651,366 B2
(45) Date of Patent: May 16, 2017

(54) DETECTING METHOD AND OPTICAL APPARATUS USING THE SAME

(71) Applicant: EVERREADY PRECISION IND. CORP., Kaohsiung (TW)

(72) Inventors: Jyh-Long Chern, Taipei (TW); Chih-Ming Yen, New Taipei (TW)

(73) Assignee: Everready Precision Ind. Corp., Kaohsiung (TW)

( * ) Notice: Subject to any disclaimer, the term of this patent is extended or adjusted under 35 U.S.C. 154(b) by 0 days.

(21) Appl. No.: 14/959,323

(22) Filed: Dec. 4, 2015

(65) Prior Publication Data

US 2016/0334207 A1    Nov. 17, 2016

(30) Foreign Application Priority Data

May 15, 2015   (CN) .......................... 2015 1 0249910
May 15, 2015   (TW) ............................. 104115679 A

(51) Int. Cl.
*G01B 11/24*     (2006.01)
*G01B 11/16*     (2006.01)
*G01B 11/25*     (2006.01)
*G01B 11/02*     (2006.01)

(52) U.S. Cl.
CPC .......... *G01B 11/167* (2013.01); *G01B 11/026* (2013.01); *G01B 11/2513* (2013.01)

(58) Field of Classification Search
CPC .... G02B 2027/0134; G02B 2027/0138; G02B 2027/014; G02B 2027/0154; G02B 27/0172; G02B 27/0176; G02B 27/64; G02B 2027/011; G02B 2027/0178; G02B 27/017; G02B 27/0006; G02B 27/48; G02B 1/18

See application file for complete search history.

(56) References Cited

U.S. PATENT DOCUMENTS

2012/0236288 A1* 9/2012 Stanley .................. G06F 3/017
                                                           356/4.01

* cited by examiner

*Primary Examiner* — Michael P Stafira
(74) *Attorney, Agent, or Firm* — Muncy, Geissler, Olds & Lowe, P.C.

(57) ABSTRACT

A detecting method and an optical apparatus using the detecting method are provided. The optical apparatus includes a structured light generation unit and a sense judging unit. When a structured light from the structured light generation unit is projected on a test surface, a test pattern and a test light spot are shown on the test surface. The sense judging unit judges whether the test surface is flat according to a deformation amount of the sensed test pattern, and acquires a distance between the test surface and the optical apparatus according to an area of the sensed test light spot. The detecting method judges whether a test surface is flat and detect a distance of the test surface. Since the structured light is used to detect the distance and the flatness of the test surface, the measuring complexity is reduced.

14 Claims, 9 Drawing Sheets

DETECTING METHOD AND OPTICAL APPARATUS USING THE SAME

FIELD OF THE INVENTION

The present invention relates to an optical apparatus, and more particularly to an optical apparatus with a detecting function.

BACKGROUND OF THE INVENTION

Recently, with the development of electronic industries and the advance of industrial technologies, various electronic devices with optical functions, particularly image capturing, are designed toward small size, light weightiness and easy portability. Consequently, these electronic devices can be applied to mobile business, entertainment or leisure purposes whenever or wherever the users are. For example, various imaging devices are widely used in many kinds of fields such as smart phones, wearable electronic devices, aerial imaging devices or any other appropriate electronic devices. Since the imaging devices are small and portable, the users can take the imaging devices to capture images and store the images according to the users' requirements. Alternatively, the images can be uploaded to the internet through mobile networks. In other words, these electronic devices not only have important commercial values but also provide more colorful lives to people.

With the improvement of the living quality, people's demands on more functions of the imaging devices are gradually increased. For example, many people are willing to acquire the distance information from the captured images or even judge the surface flatness information about the objects of the images. The distance information and the surface flatness information, which are basic elements of spatial three-dimensional structures, are important to some applications of profile identification and reconstruction, so as to advanced control, e.g., the landing control of the aerial imaging devices and collision avoidance of the unmanned aerial vehicles (UAV).

Generally, the current aerial imaging device is equipped with a laser distance detector to measure the distance of the surface to be landed. According to the distance measured by the laser distance detector, the landing process of the aerial imaging device is correspondingly controlled. However, a single laser distance detector is only able to acquire a single distance information (i.e., a single distance information about one point of the surface to be landed). For increasing the landing performance, it is necessary to provide plural laser distance detectors on the aerial imaging device. The plural laser distance detectors can be used to acquire the distances between the aerial imaging device and plural points of the surface to be landed and judge the flatness of the surface to be landed. Under this circumstance, the fabricating cost of the aerial imaging device and the computational complexity are increased.

Based on the above discussions, the conventional method of measuring the distance information and the surface flatness and the electronic device using the method need to be further improved.

SUMMARY OF THE INVENTION

For removing the drawbacks of the conventional technologies, the present invention provides an optical apparatus and a detecting method for measuring the distance and the flatness of a test surface by using a structured light.

In accordance with an aspect of the present invention, it is to provide an optical apparatus. The optical apparatus includes a structured light generation unit and a sense judging unit. The structured light generation unit projects a structured light to a test surface. When the structured light is projected on the test surface, a test pattern and a test light spot are shown on the test surface. The sense judging unit senses the test pattern and the test light spot on the test surface. The sense judging unit judges whether the test surface is flat according to a deformation amount of the sensed test pattern. Moreover, the sense judging unit acquires a distance between the test surface and the optical apparatus according to an area of the sensed test light spot.

In an embodiment, the structured light generation unit includes a light source and a lens group corresponding to the test pattern and/or the test light spot.

In an embodiment, the light source includes at least one of a laser diode (LD), a light emitting diode (LED) and an organic light emitting diode (OLED), and/or the light source emits light beams having wavelengths in a thermal band.

In an embodiment, the light source emits light beams having wavelengths in a first wavelength range and/or a second wavelength range.

In an embodiment, the light beams having the wavelengths in the first wavelength range are visible light beams, and the light beams having the wavelengths in the second wavelength range are invisible light beams.

In an embodiment, the structured light generation unit and the sense judging unit correspond to a single optical path window.

In an embodiment, the optical apparatus further includes at least one lens group. The at least one lens group is arranged in an optical path of the structured light generation unit so as to adjust a size of the test pattern on the test surface, and/or the at least one lens group is arranged in an optical path of the sense judging unit so as to adjust a field of view of the sense judging unit.

In an embodiment, the test pattern includes at least one of a grid pattern and a radial-mesh pattern, and/or the test pattern is an asymmetric pattern.

In an embodiment, the test light spot is formed when a diffusion-type light beam is projected on the test surface.

In an embodiment, the deformation amount includes a distortional deformation amount, a warping deformation amount and/or a dislocation deformation amount.

In an embodiment, the optical apparatus is applied to a portable electronic device or an aerial imaging device.

In accordance with another aspect of the present invention, there is provided a detecting method for judging whether a test surface is flat and detecting a distance of the test surface. The detecting method includes the following steps. Firstly, a structured light is projected to a test surface. When the structured light is projected on the test surface, a test pattern and a test light spot are shown on the test surface. Then, the test pattern and the test light spot on the test surface are sensed. The detecting method judges whether the test surface is flat according to a deformation amount of the sensed test pattern, and acquires a distance of the test surface according to an area of the sensed test light spot.

In an embodiment, the detecting method further includes a step of providing a light source and a lens group corresponding to the test pattern and/or the test light spot, thereby projecting the structured light to the test surface.

In an embodiment, the light source includes at least one of a laser diode (LD), a light emitting diode (LED) and an organic light emitting diode (OLED), and/or the light source emits light beams having wavelengths in a thermal band.

In an embodiment, the light source emits light beams having wavelengths in a first wavelength range and/or a second wavelength range.

In an embodiment, the light beams having the wavelengths in the first wavelength range are visible light beams, and the light beams having the wavelengths in the second wavelength range are invisible light beams.

In an embodiment, the test pattern comprises at least one of a grid pattern and a radial-mesh pattern, and/or the test pattern is an asymmetric pattern.

In an embodiment, the test light spot is formed when a diffusion-type light beam is projected on the test surface.

In an embodiment, the deformation amount includes a distortional deformation amount, a warping deformation amount and/or a dislocation deformation amount.

In an embodiment, the detecting method is applied to a portable electronic device or an aerial imaging device.

The optical apparatus and the detecting method of the present invention are capable of measuring the distance and the flatness of the test surface. Since the detecting structure and the detecting process are simplified, the complexity of judging whether the test surface is flat and the complexity of measuring the distance of the test surface will be simplified, and the fabricating cost of the electronic device using the optical apparatus and the detecting method will be reduced. Moreover, since the light source used in the optical apparatus of the present invention can provide the light beams with the wavelengths complying with different materials, the justification accuracy and the measurement accuracy are enhanced.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
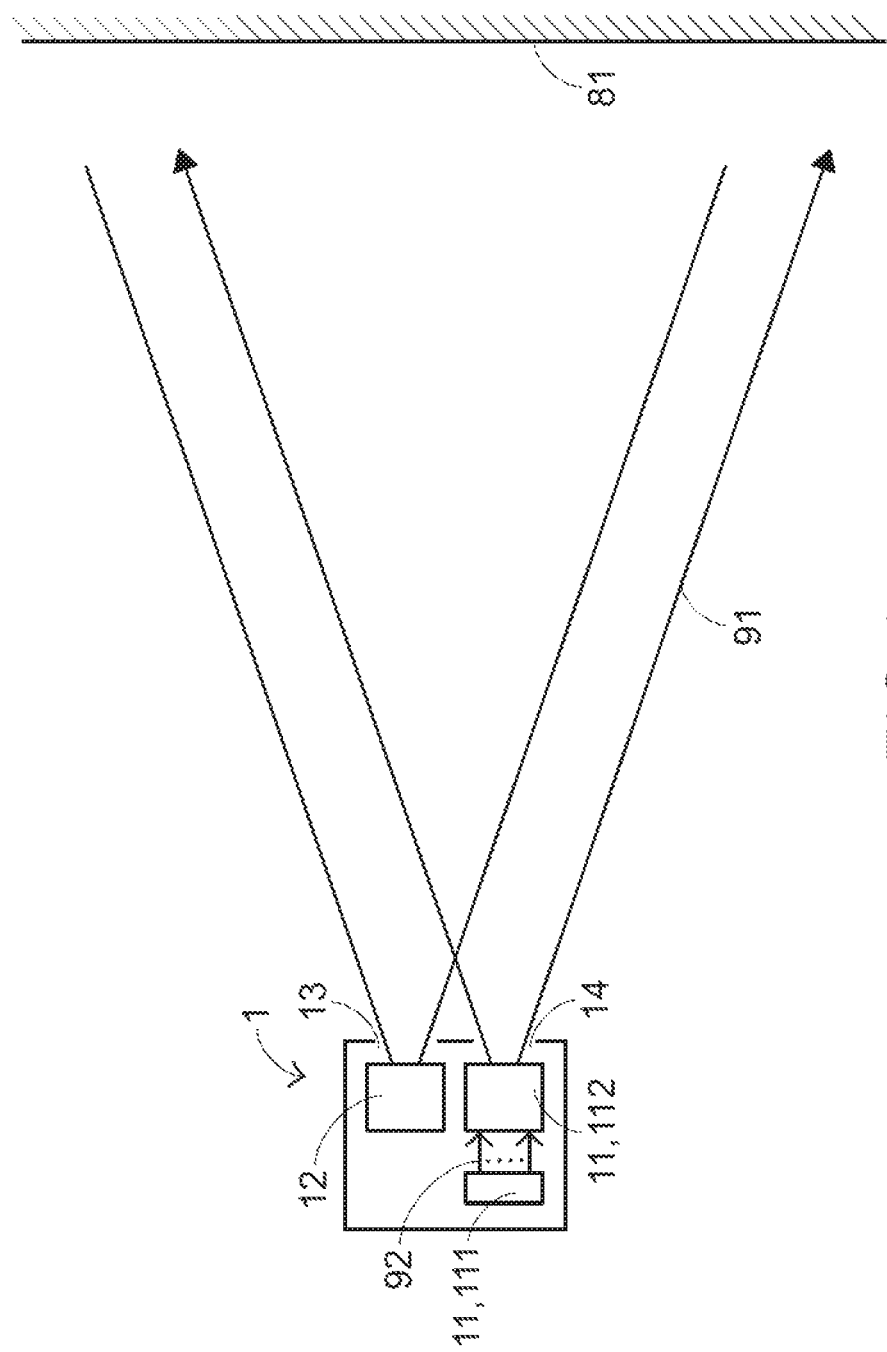
FIG. 1 schematically illustrates the structure of an optical apparatus according to a first embodiment of the present invention.
Figure 2:
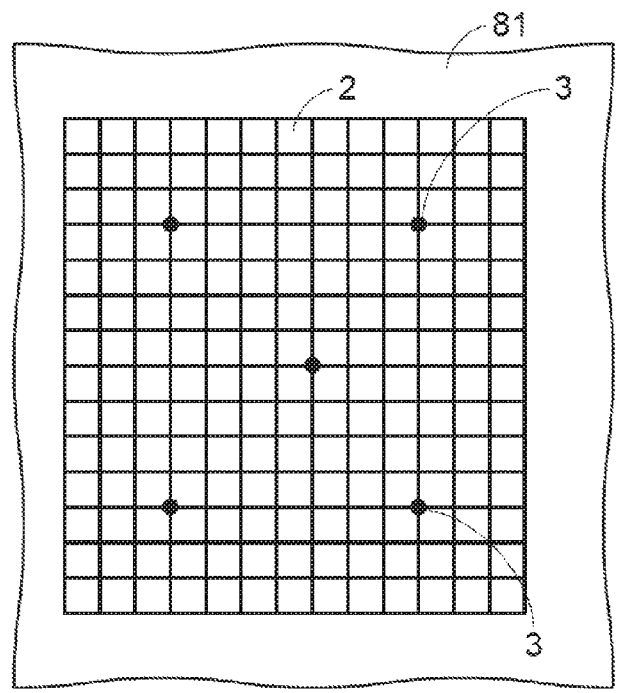
FIG. 2 is a schematic cross-sectional view illustrating a test pattern and some test light spots on a test surface when the structured light as shown in FIG. 1 is projected on the test surface.

Please refer to FIGS. 1 and 2. FIG. 1 schematically illustrates the structure of an optical apparatus according to a first embodiment of the present invention. FIG. 2 is a schematic cross-sectional view illustrating a test pattern and some test light spots on a test surface when the structured light as shown in FIG. 1 is projected on the test surface. In this embodiment, the optical apparatus 1 comprises a structured light generation unit 11 and a sense judging unit 12. The structured light generation unit 11 is used for generating a structured light 91 and projecting the structured light 91 on a test surface 81. When the structured light 91 is projected on the test surface 81, a test pattern 2 and plural test light spots 3 are shown on the test surface 81.

In this embodiment, the structured light generation unit 11 comprises a light source 111 and a first lens group 112. The light source 111 comprises a laser diode (LD), a light emitting diode (LED), an organic light emitting diode (OLED), or any other comparable semiconductor-type light emitting element similar to at least one of the laser diode (LD), the light emitting diode (LED) and the organic light emitting diode (OLED). The light source 111 is used for providing plural light beams 92. The wavelengths of the light beams 92 from the light source 111 are in a first wavelength range (e.g., visible beams) and/or a second wavelength range (e.g., invisible beams or light beams in a thermal band). The first lens group 112 at least comprises an optical component corresponding to the test pattern 2 and the test light spots 3. For example, the optical component is a diffractive optical element (not shown). After the light beams 92 from the light source 111 pass through the optical component, the structured light 91 is generated by the structured light generation unit 11. When the structured light 91 is projected on the test surface 81, the test pattern 2 and the test light spots 3 are shown on the test surface 81. In this embodiment, the test pattern 2 is a grid pattern. Moreover, each test light spot 3 is formed when a diffusion-type light beam is projected on the test surface 81. It is noted that the beam diffusion angle of each diffusion type light beam is not restricted.

The sense judging unit 12 comprises a visible light sensing unit (not shown) and/or an invisible light sensing unit (not shown). Moreover, the sense judging unit 12 is used for sensing the test pattern 2 and the test light spots 3 that are shown on the test surface 81. According to the area of the sensed test light spots 3, the sense judging unit 12 can acquire the distance between the test surface 81 and the optical apparatus 1. Moreover, according to a deformation amount of the test pattern 2, the sense judging unit 12 can judge whether the test surface 81 is flat.

Figure 3A:
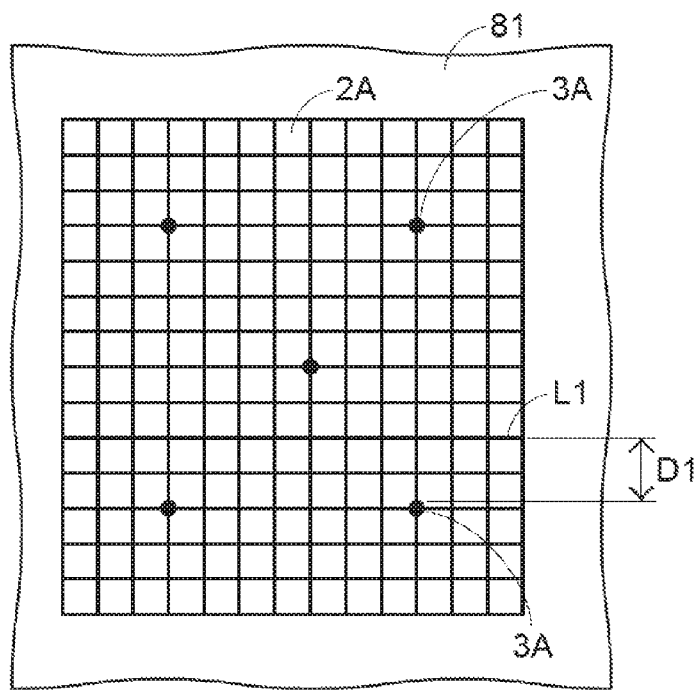
FIG. 3A schematically illustrates the test pattern and the plural test light spots that are shown on the test surface and sensed by the sense judging unit, in which the distance between the optical apparatus and the test surface is a first distance.
Figure 3B:
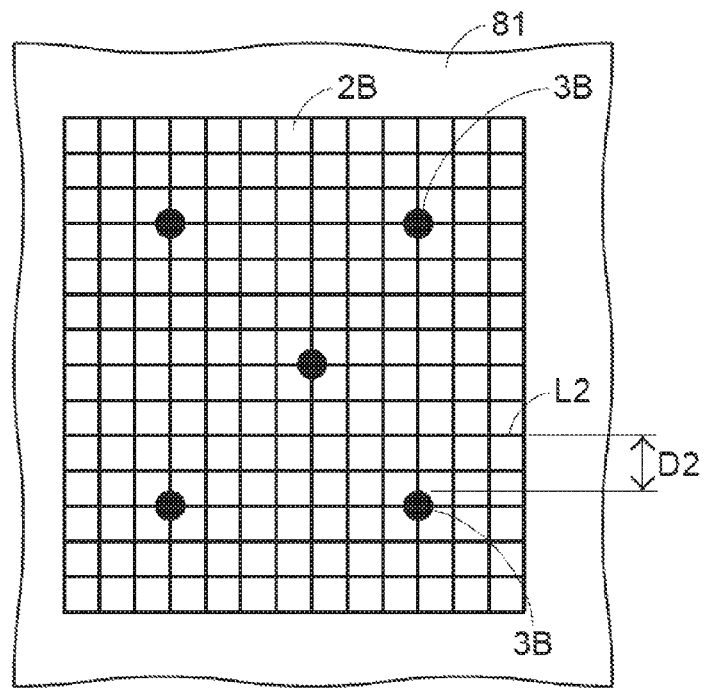
FIG. 3B schematically illustrates the test pattern and the plural test light spots that are shown on the test surface and sensed by the sense judging unit, in which the distance between the optical apparatus and the test surface is a second distance.

As mentioned above, each test light spot 3 is formed when a diffusion-type light beam is projected on the test surface 81. Consequently, in case that the distance between the test surface 81 and the optical apparatus 1 is longer, the area of the test light spot 3 on the test surface 81 is larger. Please refer to FIGS. 3A and 3B. FIG. 3A schematically illustrates the test pattern 2A and the plural test light spots 3A that are shown on the test surface 81 and sensed by the sense judging unit 12, in which the distance between the optical apparatus 1 and the test surface 81 is a first distance. FIG. 3B schematically illustrates the test pattern 2B and the plural test light spots 81 that are shown on the test surface 81 and sensed by the sense judging unit 12, in which the distance between the optical apparatus 1 and the test surface 81 is a second distance. It is found that the area of the test light spot 3A (FIG. 3A) is smaller than the area of the test light spot 3B (FIG. 3B). Consequently, the distance between the test surface 81 and the optical apparatus 1 as shown in FIG. 3A is shorter than the distance between the test surface 81 and the optical apparatus 1 as shown in FIG. 3B.

According to the area of the test light spot 3 on the test surface 81, the sense judging unit 12 can calculate the distance between the test surface 81 and the optical apparatus 1. In an approach, the area of the test light spot 3 can be obtained by calculating the pixel value corresponding to the sensing element (not shown) of the sense judging unit 12. In another approach, the area of the test light spot 3 can be obtained by measuring the distance between the test light spot 3 and a specified sub-pattern of the test pattern 2. For example, since the area of the test light spot 3A (FIG. 3A) is smaller than the area of the test light spot 3B (FIG. 3B), the distance D1 between the test light spot 3A and a horizontal line L1 of the test pattern 2A (i.e., a grid pattern) as shown in FIG. 3A is longer than the distance D2 between the test light spot 3B and a horizontal line L2 of the test pattern 2B (i.e., a grid pattern) as shown in FIG. 3B. That is, according to the distance D1 between the test light spot 3A and the horizontal line L1 of the test pattern 2A and the distance D2 between the test light spot 3B and a horizontal line L2 of the test pattern 2B, the area of the test light spot 3 can be calculated. The above approaches of calculating the area of the test light spot 3 are presented herein for purpose of illustration and description only. That is, the approaches of calculating the area of the test light spot 3 are not restricted.

Figure 3C:
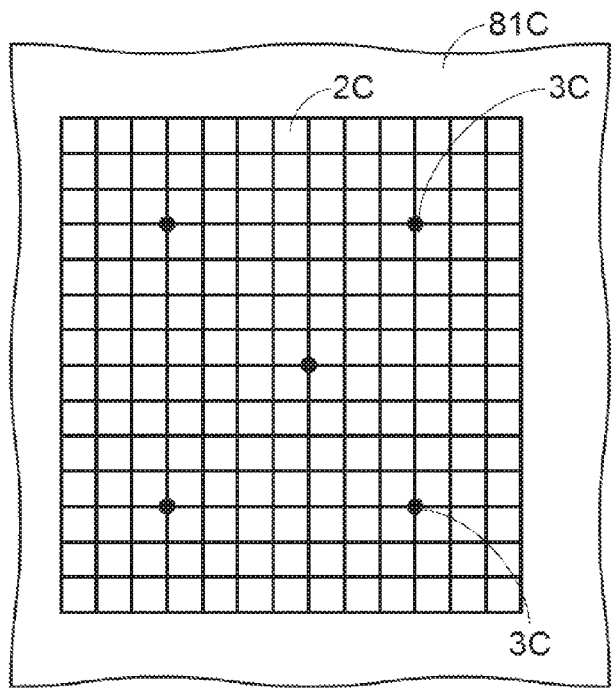
FIG. 3C schematically illustrates the test pattern and the plural test light spots that are shown on the test surface and sensed by the sense judging unit, in which the test surface is a flat surface.
Figure 3D:
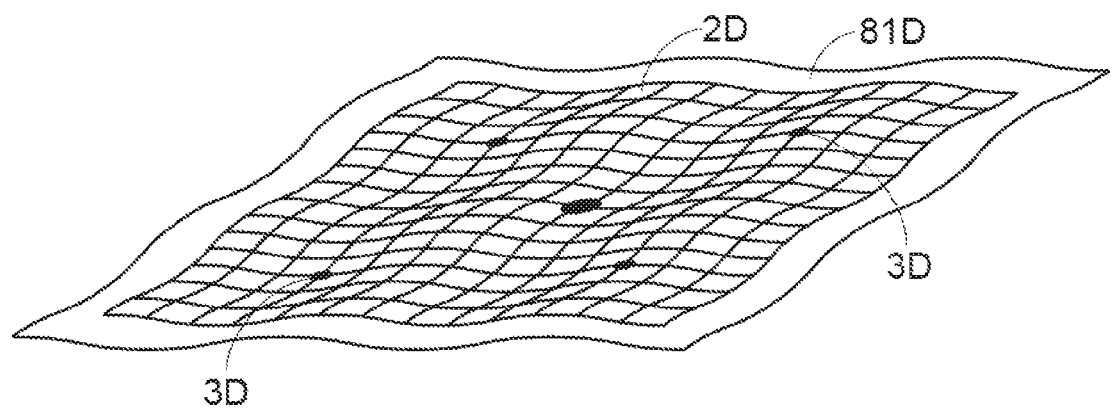
FIG. 3D schematically illustrates the test pattern and the plural test light spots that are shown on the test surface and sensed by the sense judging unit, in which the test surface is a non-flat surface.

Please refer to FIGS. 3C and 3D. FIG. 3C schematically illustrates the test pattern 2C and the plural test light spots 3C that are shown on the test surface 81C and sensed by the sense judging unit 12, in which the test surface 81C is a flat surface. FIG. 3D schematically illustrates the test pattern 2D and the plural test light spots 3D that are shown on the test surface 81D and sensed by the sense judging unit 12, in which the test surface 81D is a non-flat surface. In case that the test surface 81C is the flat surface (FIG. 3C), the test pattern 2C can be smoothly shown on the test surface 81C. In case that the test surface 81D is the non-flat surface (FIG. 3D), the test pattern 2D shown on the test surface 81D is subjected to deformation because the test surface 81D is lumpy. That is, according to the deformation amount of the test pattern 2C on the test surface 81C and the deformation amount of the test pattern 2D on the test surface 81D, the sense judging unit 12 can judge whether the test surfaces 81C and 81D are flat. Preferably but not exclusively, the deformation amount includes a distortional deformation amount, a warping deformation amount and/or a dislocation deformation amount.

Figure 4:
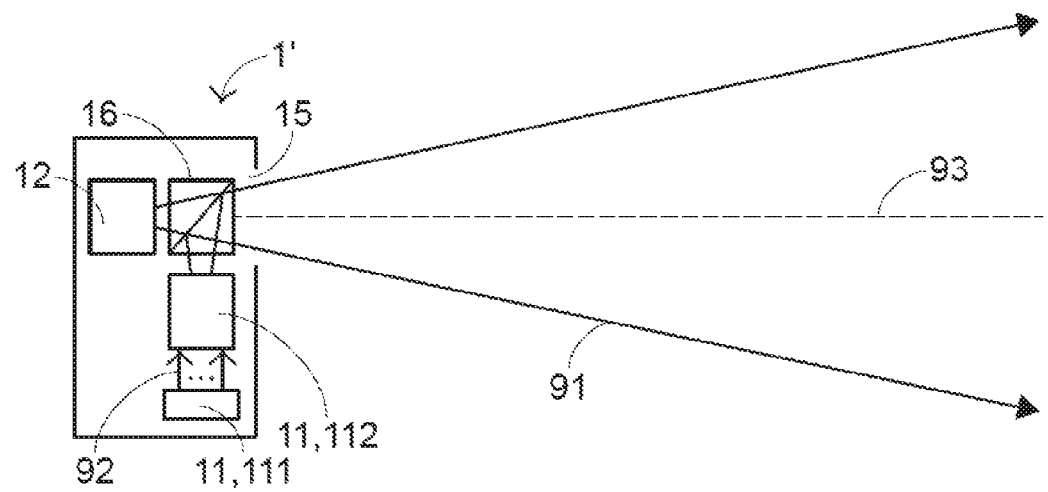
FIG. 4 schematically illustrates the structure of an optical apparatus according to a second embodiment of the present invention.

FIG. 4 schematically illustrates the structure of an optical apparatus according to a second embodiment of the present invention. The components of the optical apparatus 1' of this embodiment which are similar to the optical apparatus 1 of the first embodiment are not redundantly described herein. In the first embodiment, the structured light generation unit 11 and the sense judging unit 12 correspond to different optical path windows 14 and 13, respectively. In the second embodiment, the structured light generation unit 11 and the sense judging unit 12 correspond to the same optical path window 15.

In this embodiment, the optical apparatus 1' further comprises an optical path changing element 16 such as a beam splitter. The optical path changing element 16 is arranged between the structured light generation unit 11 and the sense judging unit 12. By the optical path changing element 16, the optical path of the light beams 92 from the structured light generation unit 11 is changed. According to this design, the structured light generation unit 11 and the sense judging unit 12 have the same optical axis 93. Under this circumstance, the optical path window 15 is shared by the structured light generation unit 11 and the sense judging unit 12. Consequently, if the distance between the optical apparatus 1' and the test surface 81 is longer, the sense judging unit 12 can sense the test pattern 2 and the test light spots 3 on the test surface 81 more accurately. That is, the test pattern 2 and the test light spots 3 at the edges of the test surface 81 (i.e., at the farther locations from the optical axis 93) can be sensed more accurately.

Figure 5:
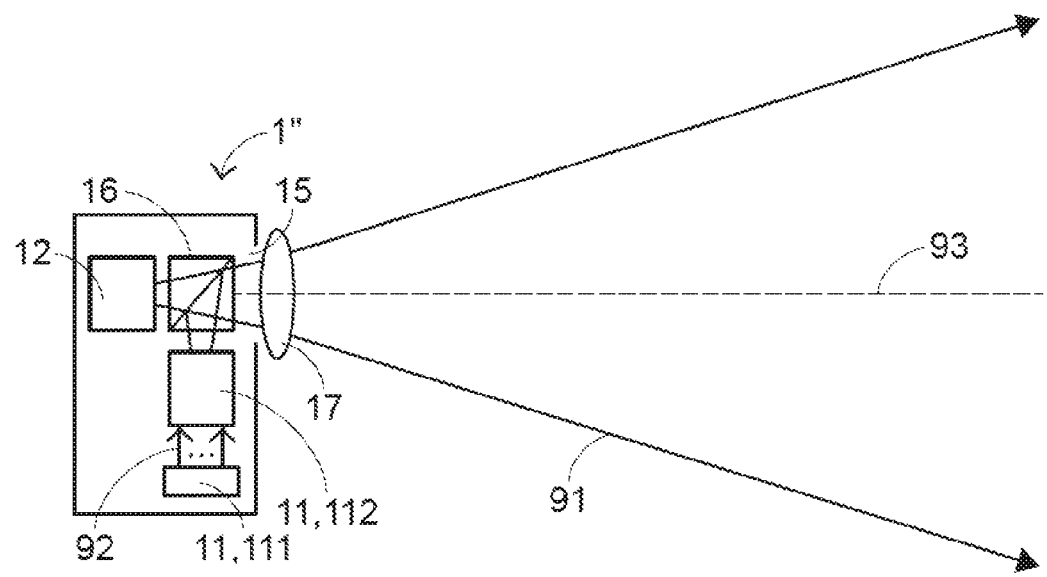
FIG. 5 schematically illustrates the structure of an optical apparatus according to a third embodiment of the present invention.

FIG. 5 schematically illustrates the structure of an optical apparatus according to a third embodiment of the present invention. The components of the optical apparatus 1" of this embodiment which are similar to the optical apparatus 1' of the second embodiment are not redundantly described herein. In comparison with the second embodiment, the optical apparatus 1" of this embodiment further comprises a second lens group 17. The second lens group 17 is arranged in the shared optical path of the structured light generation unit 11 and the sense judging unit 12, and located near the optical path window 15. By the second lens group 17, the size of the test pattern 2 shown on the test surface 81 and the field of view (FOV) of the sense judging unit 12 are changed.

Figure 6:
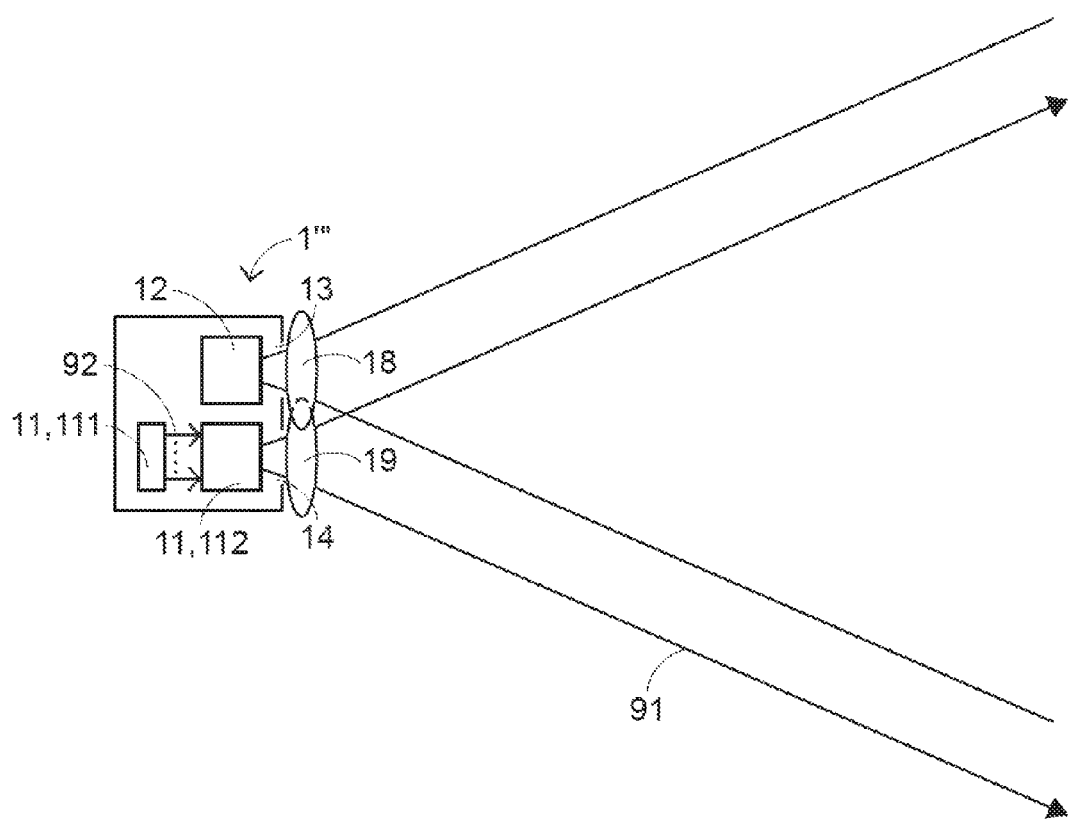
FIG. 6 schematically illustrates the structure of an optical apparatus according to a fourth embodiment of the present invention.

FIG. 6 schematically illustrates the structure of an optical apparatus according to a fourth embodiment of the present invention. The components of the optical apparatus 1'" of this embodiment which are similar to the optical apparatus 1 of the first embodiment are not redundantly described herein. In comparison with the first embodiment, the optical apparatus 1'" of this embodiment further comprises a second lens group 18 and a third lens group 19. The second lens group 18 is arranged in the optical path of the sense judging unit 12. The third lens group 19 is arranged in the optical path of the structured light generation unit 11. By the second lens group 18, the field of view (FOV) of the sense judging unit 12 is changed. By the third lens group 19, the size of the test pattern 2 shown on the test surface 81 is changed.

Especially, in the third embodiment, the second lens group 17 is selectively moved to the shared optical path of the structured light generation unit 11 and the sense judging unit 12 in some certain situations. Similarly, in the fourth embodiment, the second lens group 18 and the third lens group 19 are selectively moved to the optical paths of the sense judging unit 12 and the structured light generation unit 11 in some certain situations.

Since the purpose of selectively moving the second lens group 17 of the third embodiment is similar to the purpose of selectively moving the second lens group 18 and the third lens group 19 of the fourth embodiment, only the fourth embodiment will be illustrated as follows. For example, in case that the distance between the optical apparatus 1 and the test surface 81 is longer, the sense judging unit 12 can sense the entire of the test pattern 2 and all of the test light spots 3. Whereas, in case that the distance between the optical apparatus 1 and the test surface 81 is shorter, the area sensed by the sense judging unit 12 is reduced because the FOV of the sense judging unit 12 is not changed. That is, the sense judging unit 12 is only able to sense a portion of the test pattern 2 or portions of the test light spots 3. Under this circumstance, the sense judging unit 12 can neither realize the distance between the test surface 81 and the optical apparatus 1 nor judge whether the test surface 81 is flat. Meanwhile, if the second lens group 18 is moved to the optical path of the sense judging unit 12 to increase the FOV of the sense judging unit 12 or if the third lens group 19 is moved to the optical path of the structured light generation unit 11 to change the size of the test pattern 2 on the test surface 81, the sense judging unit 12 can sense the entire of the test pattern 2 and all of the test light spots 3. Consequently, the sense judging unit 12 can successfully realize the distance between the test surface 81 and the optical apparatus 1 and judge whether the test surface 81 is flat.

Figure 7:
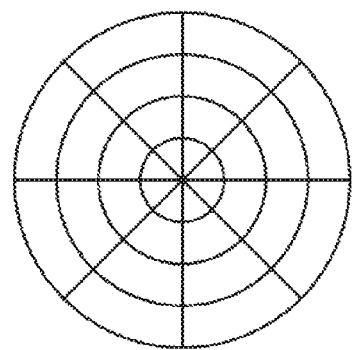
FIG. 7 schematically illustrates a variant example of a test pattern with a radial mesh shape.
Figure 8:
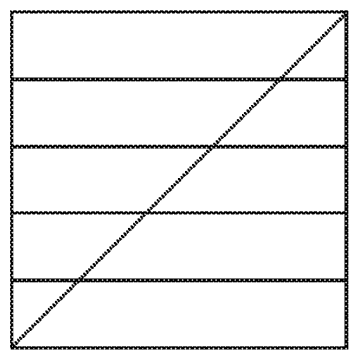
FIG. 8 schematically illustrates another variant example of a test pattern with a skew-symmetric shape.

In the above embodiments, the test pattern has been selected to be a grid pattern. Nevertheless, the type of the test pattern is not restricted. It is noted that numerous modifications and alterations may be made while retaining the teachings of the invention. For example, the test pattern may have a radial mesh shape (i.e., the radial-mesh pattern as shown in FIG. 7) or have an asymmetric pattern (i.e., a skew-symmetric pattern as shown in FIG. 8).

Figure 9:
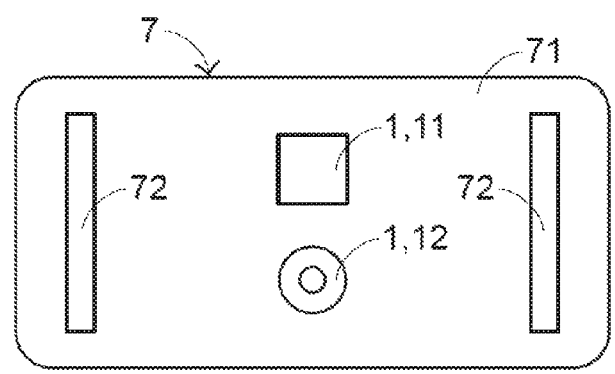
FIG. 9 is a schematic bottom view illustrating an aerial imaging device using the optical apparatus of the present invention.

FIG. 9 is a schematic bottom view illustrating an aerial imaging device using the optical apparatus of the present invention. As shown in FIG. 9, a landing gear 72 and an optical apparatus 1 are disposed on a bottom surface 71 of the aerial imaging device 7. The optical apparatus 1 comprises a structured light generation unit 11 and a sense judging unit 12. The functions of the structured light generation unit 11 and the sense judging unit 12 are similar to those of the above embodiments, and are not redundantly described herein. Since the aerial imaging device 7 can accurately realize the distance of the surface to be landed and the flatness of the surface to be landed through the optical apparatus 1, the landing performance of the aerial imaging device 7 is enhanced.

Figure 10:
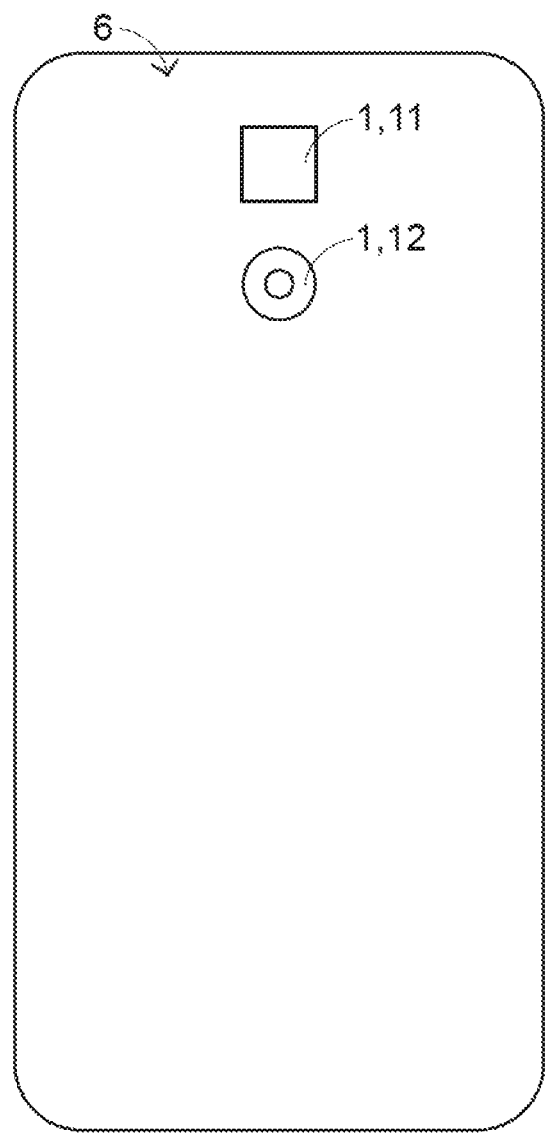
FIG. 10 is a schematic view illustrating a portable electronic device using the optical apparatus of the present invention.

FIG. 10 is a schematic view illustrating a portable electronic device using the optical apparatus of the present invention. An example of the portable electronic device 6 includes but is not limited to a mobile phone, a tablet computer or a wearable device. The portable electronic device 6 comprises an optical apparatus 1. The optical apparatus 1 comprises a structured light generation unit 11 and a sense judging unit 12. The functions of the structured light generation unit 11 and the sense judging unit 12 are similar to those of the above embodiments, and are not redundantly described herein. That is, the portable electronic device 6 can accurately realize the distance and the flatness of the surface to be used through the optical apparatus 1. The application examples as shown in FIGS. 9 and 10 are presented herein for purpose of illustration and description only. It is noted that numerous modifications and alterations may be made while retaining the teachings of FIGS. 9 and 10. That is, the optical apparatus 1 of the present invention can be applied to other electronic devices.

Figure 11:
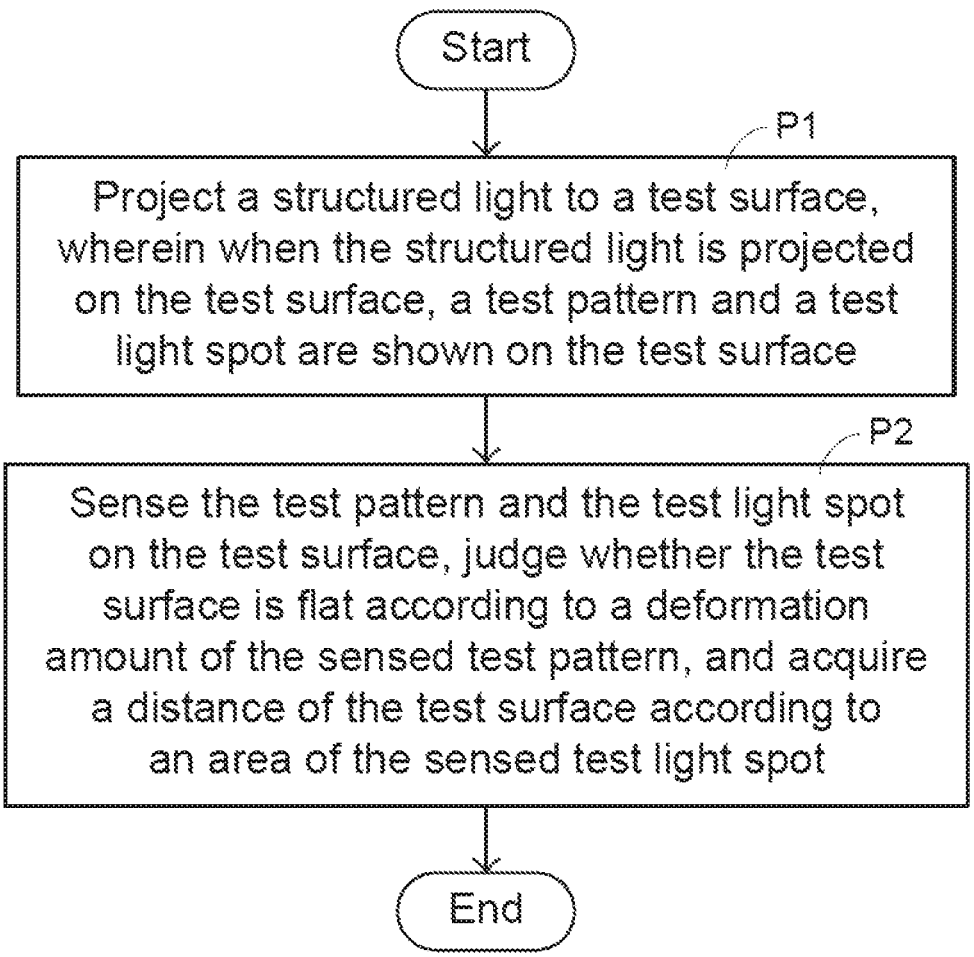
FIG. 11 schematically illustrates a flowchart of a detecting method according to an embodiment of the present invention.

A detecting method of judging whether the test surface is flat and detecting the distance of the test surface will be illustrated with reference to the flowchart of FIG. 11. FIG. 11 schematically illustrates a flowchart of a detecting method according to an embodiment of the present invention. The detecting method comprises the following steps. Firstly, a step P1 is performed to project a structured light to a test surface. When the structured light is projected on the test surface, a test pattern and a test light spot are shown on the test surface. Then, a step P2 is performed to sense the test pattern and the test light spot on the test surface, judge whether the test surface is flat according to a deformation amount of the test pattern, and acquire a distance of the test surface according to an area of the sensed test light spot. It is surely to include many test spots at different locations as for a quicker identification of wider area.

From the descriptions of the above embodiments, the detecting method of the present invention can reduce the complexity of judging whether the test surface is flat and the complexity of measuring the distance of the test surface, and can reduce the fabricating cost of the electronic device using the detecting method. Moreover, different test surfaces are possibly made of different materials, and the responses of different materials to the thermal band light beam or the infrared beam are possibly different. Since the light source used in the optical apparatus of the present invention can provide the light beams with the wavelengths complying with different materials, the judging accuracy and the measuring accuracy are enhanced.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An optical apparatus, comprising:
    a light source projecting a structured light to a test surface, so as to show a test pattern and a test light spot correlating to the structured light on the test surface; and
    a sensor sensing the test pattern and the test light spot on the test surface, wherein whether the test surface is flat is determined according to a deformation amount of the sensed test pattern relative to the structured light, and a distance between the test surface and the optical apparatus is determined according to an area of the sensed test light spot relative to the structured light.

2. The optical apparatus according to claim 1, further comprising a lens group, through which corresponding to the test pattern and/or the test light spot are rendered.

3. The optical apparatus according to claim 2, wherein the light source comprises at least one of a laser diode, a light emitting diode and an organic light emitting diode, and/or the light source emits light beams having wavelengths in a thermal band.

4. The optical apparatus according to claim 2, wherein the light source emits light beams having wavelengths in a first wavelength range and/or a second wavelength range.

5. The optical apparatus according to claim 4, wherein the light beams having the wavelengths in the first wavelength range are visible light beams, and the light beams having the wavelengths in the second wavelength range are invisible light beams.

6. The optical apparatus according to claim 1, wherein the light source and the sensor share a single optical path window.

7. The optical apparatus according to claim 1, further comprising at least one lens group, wherein the at least one lens group is arranged in an optical path of the light source so as to adjust a size of the test pattern on the test surface, and/or the at least one lens group is arranged in an optical path of the sensor so as to adjust a field of view of the sense judging unit.

8. The optical apparatus according to claim 1, wherein the test pattern comprises at least one of a grid pattern and a radial-mesh pattern, and/or the test pattern is an asymmetric pattern.

9. The optical apparatus according to claim 1, wherein the test light spot is formed when a diffusion-type light beam is projected on the test surface.

10. The optical apparatus according to claim 1, wherein the deformation amount comprises a distortional deformation amount, a warping deformation amount and/or a dislocation deformation amount.

11. The optical apparatus according to claim 1, wherein the optical apparatus is applied to a portable electronic device or an aerial imaging device.

12. A detecting method for judging whether a test surface is flat and detecting a distance of the test surface, the detecting method comprising steps of:
projecting a structured light to a test surface, wherein when the structured light is projected on the test surface, so as to show a test pattern and a test light spot correlating to the structured light on the test surface; and
sensing the test pattern and the test light spot on the test surface, judging whether the test surface is flat according to a deformation amount of the sensed test pattern relative to the structured light, and acquiring a distance of the test surface according to an area of the sensed test light spot relative to the structured light.

13. The detecting method according to claim 12, wherein the structured light is emitted from a laser diode, a light emitting diode or an organic light emitting diode, having wavelengths in a thermal band.

14. The detecting method according to claim 12, wherein the deformation amount comprises a distortional deformation amount, a warping deformation amount and/or a dislocation deformation amount.

* * * * *